United States Patent
Belzile

(10) Patent No.: US 6,801,952 B2
(45) Date of Patent: Oct. 5, 2004

(54) METHOD AND DEVICES FOR PROVIDING NETWORK SERVICES FROM SEVERAL SERVERS

(75) Inventor: Pierre Belzile, Lachine (CA)

(73) Assignee: Nortel Networks Limited, St. Laurant (CA)

(*) Notice: Subject to any disclaimer, the term of this patent is extended or adjusted under 35 U.S.C. 154(b) by 45 days.

(21) Appl. No.: 10/227,413

(22) Filed: Aug. 26, 2002

(65) Prior Publication Data

US 2003/0005163 A1 Jan. 2, 2003

Related U.S. Application Data

(63) Continuation of application No. 09/144,108, filed on Aug. 31, 1998, now abandoned.

(51) Int. Cl.⁷ .......................... H04M 11/00; H04L 12/66
(52) U.S. Cl. ............... 709/249; 379/221.01; 379/88.12; 370/401
(58) Field of Search ............................... 707/10, 104.1; 709/217–219, 223–226, 227–244, 249, 311; 370/351–356, 400, 401; 379/219, 220.01, 221.01–221.04, 221.14, 88.12, 88.16–88.21

(56) References Cited

U.S. PATENT DOCUMENTS

| 4,644,468 A | * | 2/1987 | Doster et al. ................ 709/220 |
| 4,771,425 A | | 9/1988 | Baran et al. ................... 370/85 |
| 4,969,184 A | | 11/1990 | Gordon et al. ............... 379/100 |
| 4,995,074 A | | 2/1991 | Goldman et al. ............. 379/97 |
| 5,363,431 A | | 11/1994 | Schull et al. ................. 379/67 |
| 5,434,906 A | | 7/1995 | Robinson ..................... 379/67 |
| 5,533,110 A | | 7/1996 | Pinard et al. ................ 379/201 |
| 5,557,105 A | | 9/1996 | Baum et al. .................. 379/93 |
| 5,604,737 A | | 2/1997 | Iwami et al. ................ 370/352 |
| 5,608,786 A | | 3/1997 | Gordon ........................ 379/100 |
| 5,610,910 A | | 3/1997 | Focsaneanu et al. ........ 370/351 |

(List continued on next page.)

FOREIGN PATENT DOCUMENTS

| AU | B-56456/94 | 7/1996 |
| CA | 2110711 | 1/1993 |
| CA | 2197204 | 2/1996 |
| CA | 2167215 | 7/1997 |
| EP | 0 732835 A2 | 9/1996 |

(List continued on next page.)

OTHER PUBLICATIONS

Baran, P., "On Distributed Communications Networks", IEEE Transactions on Communications, (Mar. 1964), pp. 1–9.

(List continued on next page.)

Primary Examiner—Maria N. Von Buhr

(57) ABSTRACT

Methods and devices for obtaining a network service at a network interconnected computing device (18) from one of plurality of network servers (16a, 16b, 16c), are disclosed. The computing device (18) contacts a first network server (16a) having a first network address, using the network address over the network (10). The device (18) provides this server (16a) with an identifier of the computing device. This identifier may, for example, be a persistent state object or "cookie". The server (16a), in response, queries a database and determines a second network address of a server (16a, 16b or 16c) used to provide a service to the computing device, based on the identifier. This address is provided to the computing device (18). The network addresses of servers (16a, 16b, 16) may be uniform resource locators. The computing device (18), in turn, contacts the server identified by the second network address and obtains the network service. The service, may for example, include receiving an indicator at the computing device of an incoming telephone call on a telephone network.

13 Claims, 8 Drawing Sheets

U.S. PATENT DOCUMENTS

| | | | |
|---|---|---|---|
| 5,625,676 A | | 4/1997 | Greco et al. .................. 379/88 |
| 5,796,952 A | * | 8/1998 | Davis et al. ................ 709/224 |
| 5,805,587 A | | 9/1998 | Norris et al. ................ 370/352 |
| 5,884,312 A | * | 3/1999 | Dustan et al. ................ 707/10 |
| 5,999,965 A | * | 12/1999 | Kelly ......................... 709/202 |
| 6,026,296 A | * | 2/2000 | Sanders et al. .......... 455/426.1 |
| 6,055,574 A | * | 4/2000 | Smorodinsky et al. ...... 709/226 |
| 6,070,185 A | * | 5/2000 | Anupam et al. ............ 709/204 |
| 6,073,172 A | * | 6/2000 | Frailong et al. ............ 709/222 |
| 6,131,121 A | * | 10/2000 | Mattaway et al. .......... 709/227 |
| 6,144,667 A | * | 11/2000 | Doshi et al. ................ 370/401 |
| 6,144,670 A | * | 11/2000 | Sponaugle et al. ......... 370/401 |
| 6,173,311 B1 | * | 1/2001 | Hassett et al. .............. 709/202 |
| 6,178,438 B1 | * | 1/2001 | Tschirhart et al. .......... 709/200 |
| 6,178,453 B1 | * | 1/2001 | Mattaway et al. .......... 709/227 |
| 6,185,204 B1 | * | 2/2001 | Voit ........................... 370/352 |
| 6,189,030 B1 | * | 2/2001 | Kirsch et al. ............... 709/224 |
| 6,215,784 B1 | * | 4/2001 | Petras et al. ................ 370/356 |
| 6,249,814 B1 | * | 6/2001 | Shaffer et al. .............. 709/223 |
| 6,347,085 B2 | * | 2/2002 | Kelly ......................... 370/352 |
| 6,353,610 B1 | * | 3/2002 | Bhattacharya et al. ...... 370/352 |
| 6,393,467 B1 | * | 5/2002 | Potvin ........................ 709/217 |
| 6,430,178 B1 | * | 8/2002 | Yahiro ........................ 370/356 |
| 6,501,750 B1 | * | 12/2002 | Shaffer et al. .............. 370/352 |
| 6,594,254 B1 | * | 7/2003 | Kelly ......................... 370/352 |
| 6,594,257 B1 | * | 7/2003 | Doshi et al. ................ 370/352 |

FOREIGN PATENT DOCUMENTS

| | | |
|---|---|---|
| WO | WO 94/24803 | 10/1994 |
| WO | WO 95/18501 | 7/1995 |
| WO | WO 96/05684 | 2/1996 |
| WO | WO 96/09714 | 3/1996 |
| WO | WO 96/38018 | 11/1996 |
| WO | WO 97/20424 | 6/1997 |
| WO | WO 97/26749 | 7/1997 |
| WO | WO 97/35416 | 9/1997 |
| WO | WO 97/37483 | 10/1997 |
| WO | WO 97/47118 | 12/1997 |
| WO | WO 98/01985 | 1/1998 |
| WO | WO 98/07266 | 2/1998 |

OTHER PUBLICATIONS

Shankar, U. and C. Lai, "Interworking Between Access Protocol and Network Protocol for Interswitch ISDN Services", TENCON '89, Bombay, India, Nov. 1989.

Casner, et al., "RFC14ZZ: Integrated Service in the Internet Architecture", Sep., 1993.

Clark, D.D., S. Shenker and L. Zhang, "Supporting Real-Time Applications in an Integrated Services Packet Network: Architecture and Mechanism", SIGCOMM92, Aug. 1992.

Yang, C., "RFC1789: INETPhone: Telephone Services and Servers on Internet", Network Working Group, Apr. 1995.

Braden et al., "RFC 1633: Integrated Services in the Internet Architecture: an Overview", Network Working Group, Jun. 1994.

Burson, A.F. and A.D. Baker, "Optimizing Communications Solutions", IEEE Communications Magazine, 31(1), (Jan. 1993), pp. 15–19.

"Workstation Communications System", IBM Technical Disclosure Bulletin, 37(9), (Sep. 1994), pp. 101–104.

Babbage, R.I. Moffat, A. O'Neil and S. Sivaraj, "Internet Phone—Changing the Telephony Paradigm?", BT Technology Journal, 15(2) (Apr.1997), pp. 145–157.

Hansson, A., R. Nedjeral and I. Tonnby, "Phone Doubler—A Step Towards Integrated Internet and Telephone Communities", Ericsson Review 4 (1997), pp. 142–151.

"Here It Comes—the Phone Doubler", Ericsson Connexion, (Jun. 1997), p. 47.

"Internet and Ericsson", Ericsson Connexion, (Dec. 1996), pp. 46–47.

Low, C., "The Internet Telephony Red Herring", Hewlett Packard, Laboratories Tech. Report, May 15, 1996, pp. 1–15.

CMP Publications, Inc., Masued, Sam, "Product Supports Voice on Net", Apr. 7, 1997, p. 1–2.

Business Wire, Inc., "Ericsson Product Allows Simultaneous Voice and Internet Connections Over One Phone Line", Mar. 11, 1997. pp. 1–2.

Business Wire, Inc., "Ericsson's New Phone Doubler Combines Voice and Internet Over a Single Telephone Line", Mar. 10, 1997, pp. 1–2.

* cited by examiner

| USER | DIAL NUMBER | STATUS | IP ADDRESS | SERVER |
|---|---|---|---|---|
| John Smith | 555-1234 | 0 | - | www.server3.com |
| Jane Doe | 555-6789 | 1 | 207.23.24.27 | www.server2.com |
| | | | | |
| | | | | |
| | | | | |

METHOD AND DEVICES FOR PROVIDING NETWORK SERVICES FROM SEVERAL SERVERS

CROSS-REFERENCE TO RELATED APPLICATIONS

This application is a continuation of U.S. patent application Ser. No. 09/144,108 filed Aug. 31, 1998 now abandoned.

FIELD OF THE INVENTION

The present invention relates to networked computing devices, and more particularly to a method and devices for offering network based services from multiple servers, thereby allowing for the scalable provision of services.

BACKGROUND OF THE INVENTION

Packet switched computer networks have become widely used. The best known and most widely used example of such a network is the public internet.

Because of its popularity, the internet has become a desirable vehicle to provide a variety of new services to subscribers. Such services include network commerce, network telephony services, messaging services, video and audio on demand services, and the like. Many of these services appeal to large segments of the population and attract thousands of subscribers.

In order to reduce the cost and simplify the provision of such services, the architecture of devices hosting these services should be scalable. That is, a particular service should preferably be provided by multiple servers, instead of a single server.

An example network service is the Internet Call Waiting ("ICW") service, as disclosed in U.S. patent application Ser. No. 08/911,036, the contents of which are hereby incorporated by reference. Known ICW servers are interconnected with the internet and a telephone network such as the public switched telephone network ("PSTN"). This makes the scalability of such servers difficult.

Solutions enabling scalability of servers that rely only on an internet connection are known. Several such solutions distribute internet protocol ("IP") connection requests across several servers. For example, a unique unified resource locator ("URL") may be mapped by a server providing domain name service ("DNS") to several different IP addresses, each IP address corresponding to a different physical server. Other known solutions distribute IP requests for a single IP address to multiple servers. A combination of these solutions can result in a network architecture that is scalable and that accommodates many different services.

On the other hand, services that rely on both PSTN and internet connectivity are further constrained by PSTN connectivity of a hosting server. Typically, such a server accommodates from one to a few hundred PSTN circuits. In some cases, a specific assigned server must be used for a given subscriber of the service. More sophisticated arrangements allow any server in a group to be used for any subscriber. This is not always possible or may require a costly front-end PSTN switch or other costly hardware and software.

Alternatively, each subscriber may be required to configure software to contact an assigned server. However, this complicates subscriber configuration requirements and further limits the ability of using several servers to provide service to a single subscriber.

Accordingly, improved methods and devices that allow a network subscriber service to be provided by one of many servers are desirable.

SUMMARY OF THE INVENTION

In accordance with the present invention, there is provided a method of obtaining a network service at a network interconnected computing device, the method comprising the steps of:
a. contacting a first network server having a first network address, using the network;
b. providing the first network server with an identifier of the computing device; and
c. obtaining from the first network server a second identifier of a network server, provided by the first network server based on the identifier provided in step b.

According to another aspect of the invention, there is provided a method of operating a plurality of network servers, comprising the steps of:
a. receiving a message from a network interconnected computing device, the message comprising an identifier of the computing device at a first server;
b. selecting one of the plurality of network servers based on the identifier; and
c. providing network service from the server selected in step b. to the computing device.

According to a further aspect of the invention, there is provided a network interconnected server comprising:
a processor;
a network interface in communication with a data network and the processor;
persistent storage memory in communication with the processor, and storing processor readable instructions that adapt the server to,
a. maintain a database of identifiers of network interconnected computing device;
b. receive a message from a network interconnected computing device using the network interface, the message comprising an identifier of the computing device;
c. query the database using the identifier; and
d. provide, to the network based computing device using the interface, an address of a network interconnected server for providing service to the interconnected computing device.

According to yet a further aspect of the invention, there is provided a network interconnected computing device, comprising:
a processor;
a network interface in communication with a data network and the processor;
persistent storage memory in communication with the processor, and storing processor readable instructions that adapt the device to,
a. contact a first network server having a first network address, using the network interface;
b. provide the first network server with an identifier of the computing device;
c. obtain from the first network server a second identifier of a network server, provided by the first network server based on the identifier provided in step b; and
d. provide the network server identified by the second identifier with an identifier of the computer to obtain network services from the second network server.

According to yet a further aspect of the invention, there is provided a network interconnected server comprising:
means for maintaining a database of identifiers of network interconnected computing device;

means for receiving a message from a network interconnected computing device, the message comprising an identifier of the computing device;

means for querying the database using the identifier; and means for providing to the network based computing device, an address of a network interconnected server based on the identifier.

According to yet a further aspect of the invention, there is provided a computer readable medium comprising a software program that when loaded into a computer adapts the computer to:

a. maintain a database of identifiers of network interconnected computing devices;

b. receive a message from a network interconnected computing device, the message comprising an identifier of the computing device;

c. query the database using the identifier; and d. provide to the network based computing device, an address of a network interconnected server, based on the identifier.

Advantageously, subscribers to the service remain unaware of the actual number of servers providing the service and of the particular server providing the service.

BRIEF DESCRIPTION OF THE DRAWING

In figures which illustrate, by way of example, embodiments of the present invention.

FIG. 4 illustrates an organization of a database at the server of FIG. 2;

DETAILED DESCRIPTION

Figure 1:
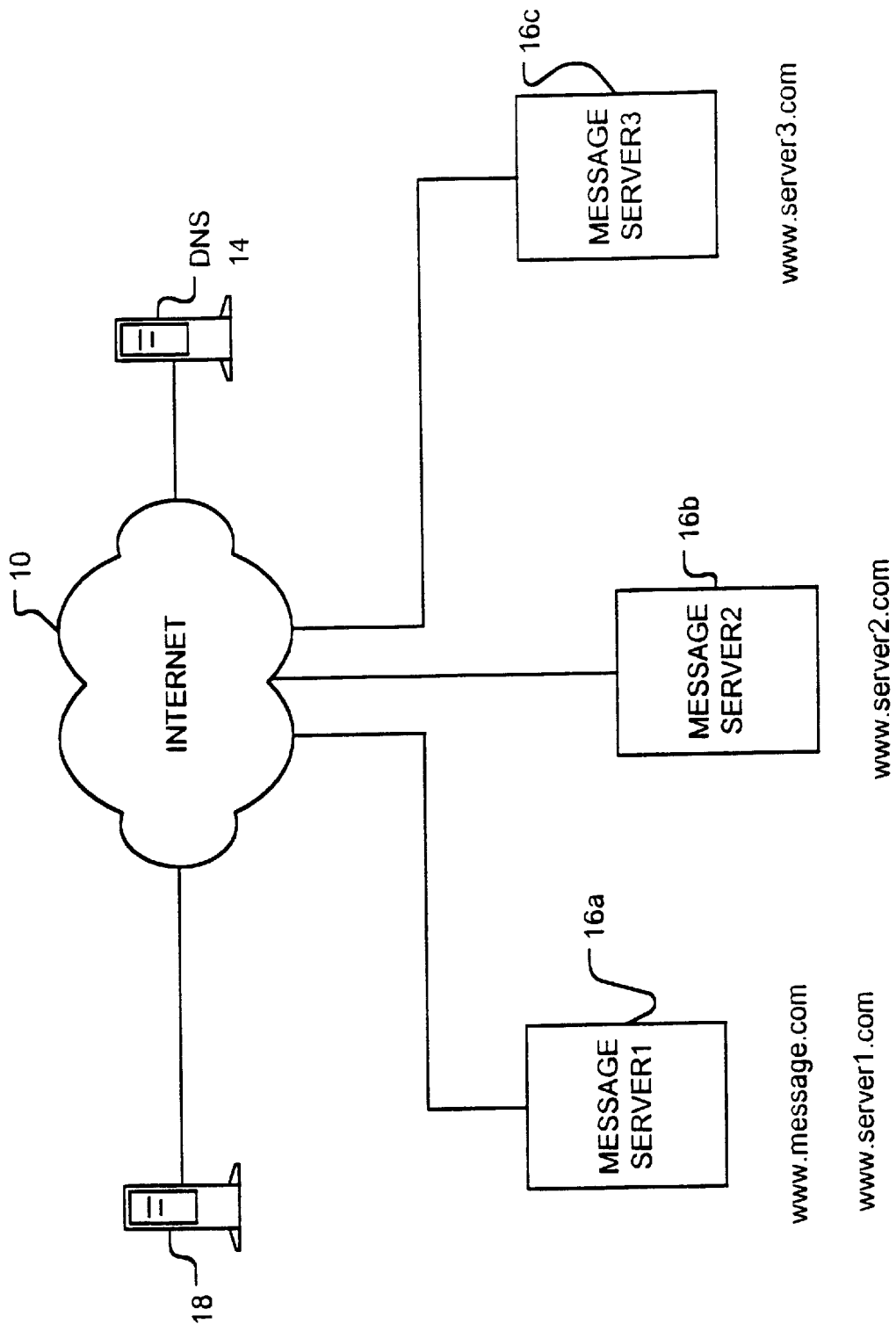
FIG. 1 illustrates a plurality of interconnected computing devices, including a plurality of servers and an end-user computing device, exemplary of embodiments of the present invention.

FIG. 1 illustrates a plurality of computing devices 14, 16a, 16b, 16c, and 18 interconnected to each other by way of network 10. Preferably, network 10 is a packet switched data network, using the internet protocol ("IP"), as detailed in the Internet Engineering Task Force Request for Comment ("RFC") 791, to exchange data in the form of packets between interconnected computing devices, such as computing devices 14, 16a, 16b, and 16c, 18. Network 10 may for example, be the public internet, a private intranet, or any other suitable local or wide area network.

In the illustrated embodiment, device 18 is an end-user work station; device 14 is a network server providing the known internet domain name service ("DNS") as detailed in RFCs 2136 and 2137, the contents of both of which are hereby incorporated by reference; and devices 16a, 16b and 16c are other internet servers exemplary of the present invention. Servers 16a, 16b and 16c may be hyper-text-transfer protocol ("HTTP") servers offering internet commerce, or database services; internet message servers, such as the ICW server detailed more particularly in U.S. patent application Ser. No. 08/911,036; directory servers; or the like.

Devices 14, 16a, 16b, 16c and 18 may be interconnected with network 10 in any of a number of ways. For example, device 14 may be directly interconnected with a network router using an Ethernet or other physical interface. Device 18 may be intermittently connected to network 10 through the public switched telephone network (the "PSTN"—not illustrated). Similarly, devices 16a, 16b and 16c could be connected to network 10, by an asynchronous transfer mode ("ATM") switch (not illustrated); an integrated standards digital network ("ISDN") (not illustrated); a local area network (not illustrated); or any other suitable physical connection to network 10.

Figure 2:
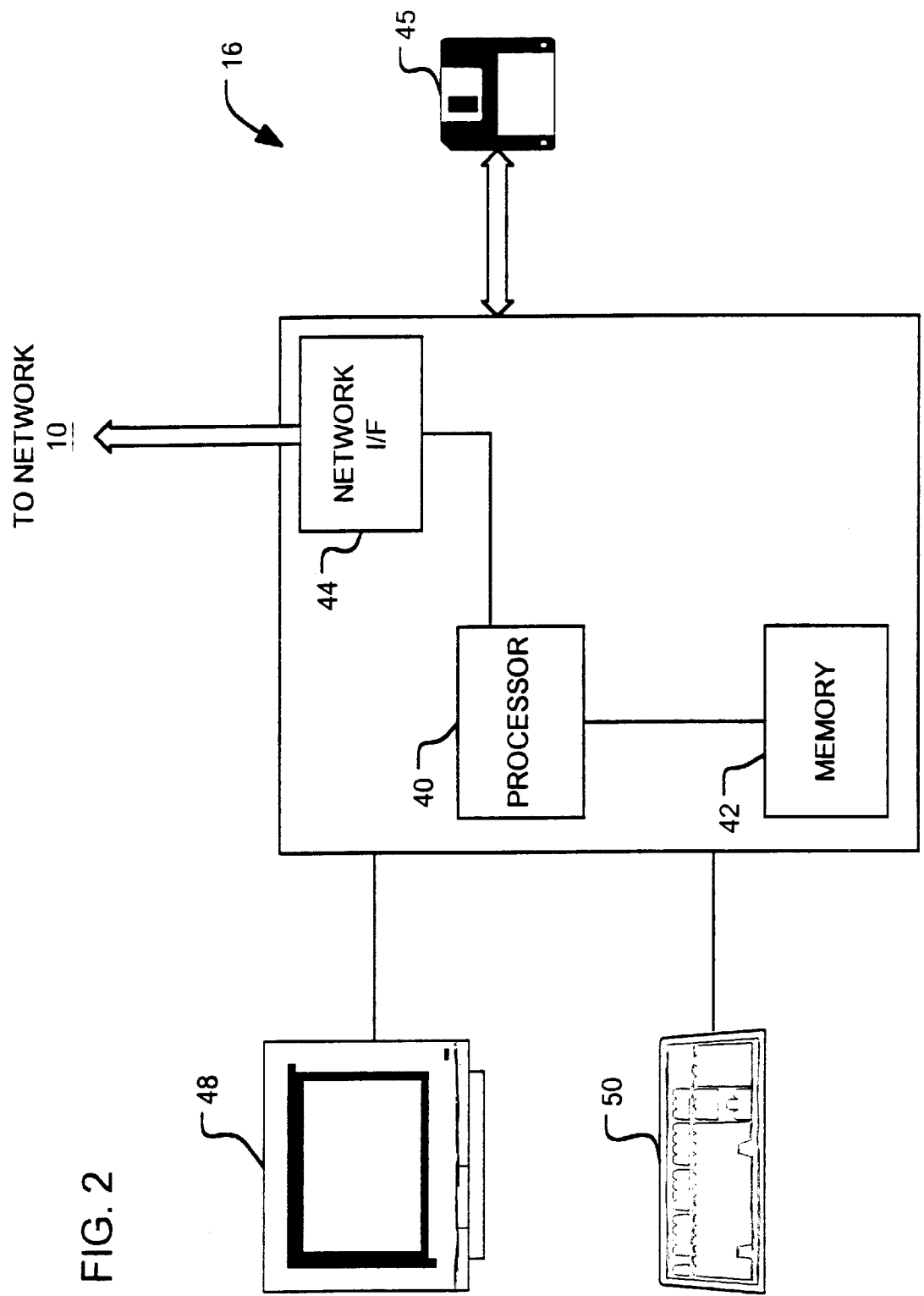
FIG. 2 is a block diagram of an architecture of a server of FIG. 1.

The architecture of each of servers 16a, 16b, and 16c (generically referred to as server 16) is substantially similar and is illustrated in FIG. 2. Each server 16 is typically a conventional server suitable computing device. Server 16, may for example be a SUN Sparc server; a Microsoft NT Server; a Hewlett Packard HPUX server, or the like. Each server 16 comprises a processor 40, in communication with persistent storage memory 42, and network interface 44. As well, server 16 may optionally comprise a display 48 and input device 50, such as a keyboard, mouse or the like.

Processor 40 comprises a conventional central processing unit, and may for example comprise a microprocessor in the INTEL x86 family. Of course, processor 40 could be a RISC based CPU; a Motorola CPU, or any other suitable processor known to those skilled in the art. Memory 42 preferably comprises a suitable combination of random access memory, read-only-memory, and disk storage memory used by processor 40 to store and execute programs adapting server 16 to act as a network server as detailed below. Memory 42 may include a device capable of reading and writing data to or from a computer readable medium 45 used to store software and data to be loaded into memory 42. Network interface 44 comprises any interface suitable to physically link server 16 to network 10. Interface 44, may for example be an Ethernet, ATM or ISDN interface or even a telephone modem that may be used to pass data, in the form of packets from and to the remainder of network 10. Servers 16 may comprise further hardware depending on the particular service offered. For example, in the event server 16 acts as a message server each will typically be equipped with an additional interface for connection with another network such as the PSTN, as for example detailed in co-pending U.S. patent application Ser. No. 09/144,111 entitled "NETWORK INTERCONNECTED COMPUTING DEVICE, SERVER AND NOTIFICATION METHOD", filed concurrently herewith, naming Carl Potvin as inventor, now issued as U.S. Pat. No. 6,393,467 and hereby incorporated herein by reference.

Figure 3:
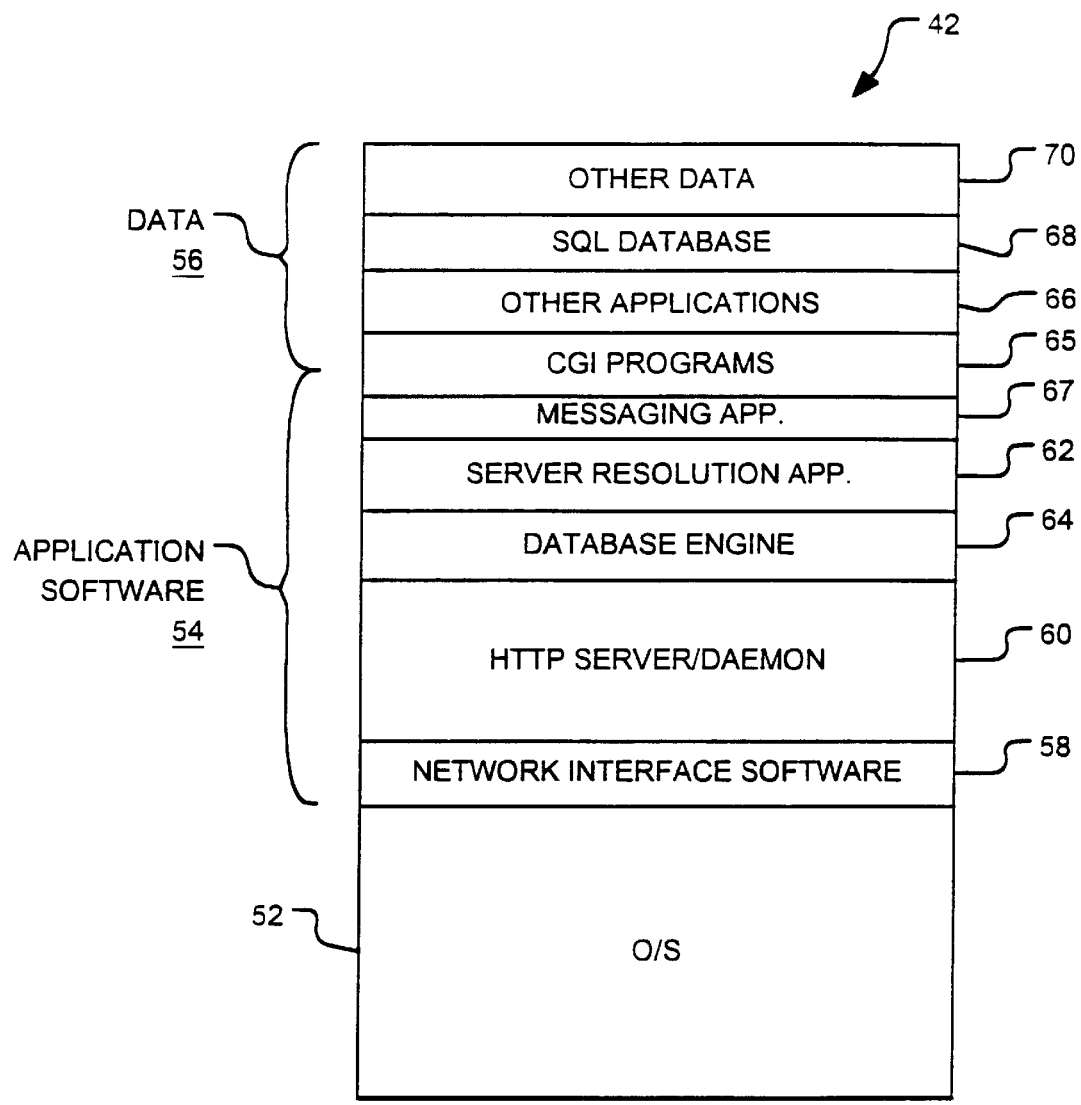
FIG. 3 illustrates an organization of memory of the server of FIG. 2.

An exemplary organization of memory 42 of server 16 is illustrated in FIG. 3. Stored within memory 42 are computer software programs and data that are loaded into working memory of server 16 to permit server 16 to be operable as a network server. As illustrated, memory 42 stores operating system software 52; application software 54; and data 56. Operating system software 52 may, for example, be Microsoft NT Server operating system software, UNIX operating system software, or the like. Application software 54 includes network interface software 58, that typically includes an internet protocol suite allowing communication of server 16 and thus operating system 52 with network 10, through physical network interface 44 (FIG. 2). Application software 54 further includes an HTTP server or daemon 60; a server resolution application 62; common gateway interface ("CGI") programs 65; and a messaging application 67, exemplary of the present invention.

HTTP server 60 may for example be an Apache Web Server or a Microsoft Internet Information Server application. CGI programs 65 typically interface HTTP server application 60 with other data and applications at server 16. CGI programs 65 may be compiled or interpreted programs, and may therefore include a suitable interpreter such as a Perl interpreter, or the like. Messaging application 67 may provide subscribers with a subscribed-to service, such as the ICW service, notifying subscribers of events, including for example, an indicator of an incoming telephone call at a telephone network, as detailed below.

Preferably, and in addition, forming part of application software 54 is a database application or engine 64, such as, for example, a structured query language ("SQL") database engine capable of retrieving, updating, deleting and otherwise operating on records stored within a database 68. Database 68 stores records representative of subscribers served by servers 16 in accordance with the present invention. Other applications 66 and data 70 may also be stored within memory 42. As will be appreciated application software 54 may be formed by standard programming techniques known to those skilled in the art.

FIG. 4 illustrates an exemplary organization of data within database 68. As illustrated database 68 contains a plurality of records 72a, 72b and so on (collectively and individually 72). Each record is typically associated with a single subscriber and preferably contains at least one field 74 containing data identifying the subscriber possibly by name; one field 76 containing a further subscriber identifier, typically including a telephone dial number associated with the subscriber; a field 78 containing a status indicator indicating whether or not a subscriber has initiated a network session and "registered" with server 16; a field 82 containing a session IP address, identifying the subscriber's current IP address; and field 84 containing the URL of a server adapted to provide the subscriber a network service. As will be appreciated, each record 72 could contain many other fields. As well, database 68 has been illustrated as a relational database, but could easily take another form such as an object oriented database.

Figure 5:
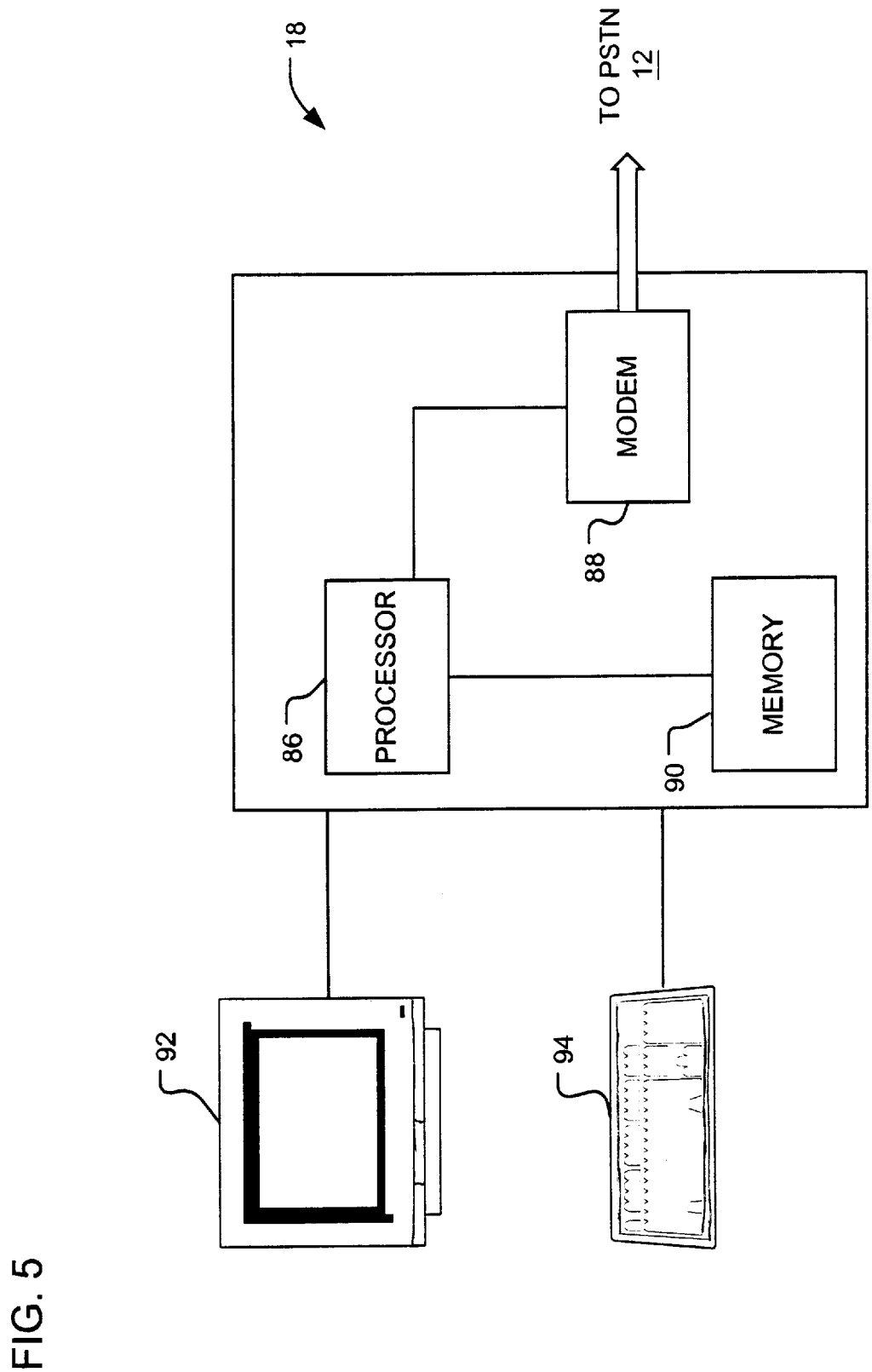
FIG. 5 illustrates an architecture of an end-user computing device, illustrated in FIG. 1.

FIG. 5 illustrates, in block diagram, an exemplary architecture of computing device 18 used by an end-user. Computing device 18 is a typical home or office computer comprising a processor 86, in communication with persistent memory 90, a network interface such as modem 88, a display 92, and typically at least one input device 94. Processor 86 is a typical central processing unit and may be a processor in the INTEL x86 family. Persistent memory 90 preferably comprises a hard drive, RAM and ROM memories. Modem 88 is typically a conventional telephone modem such as for example a U.S. Robotics Sportster or equivalent modem.

Figure 6:
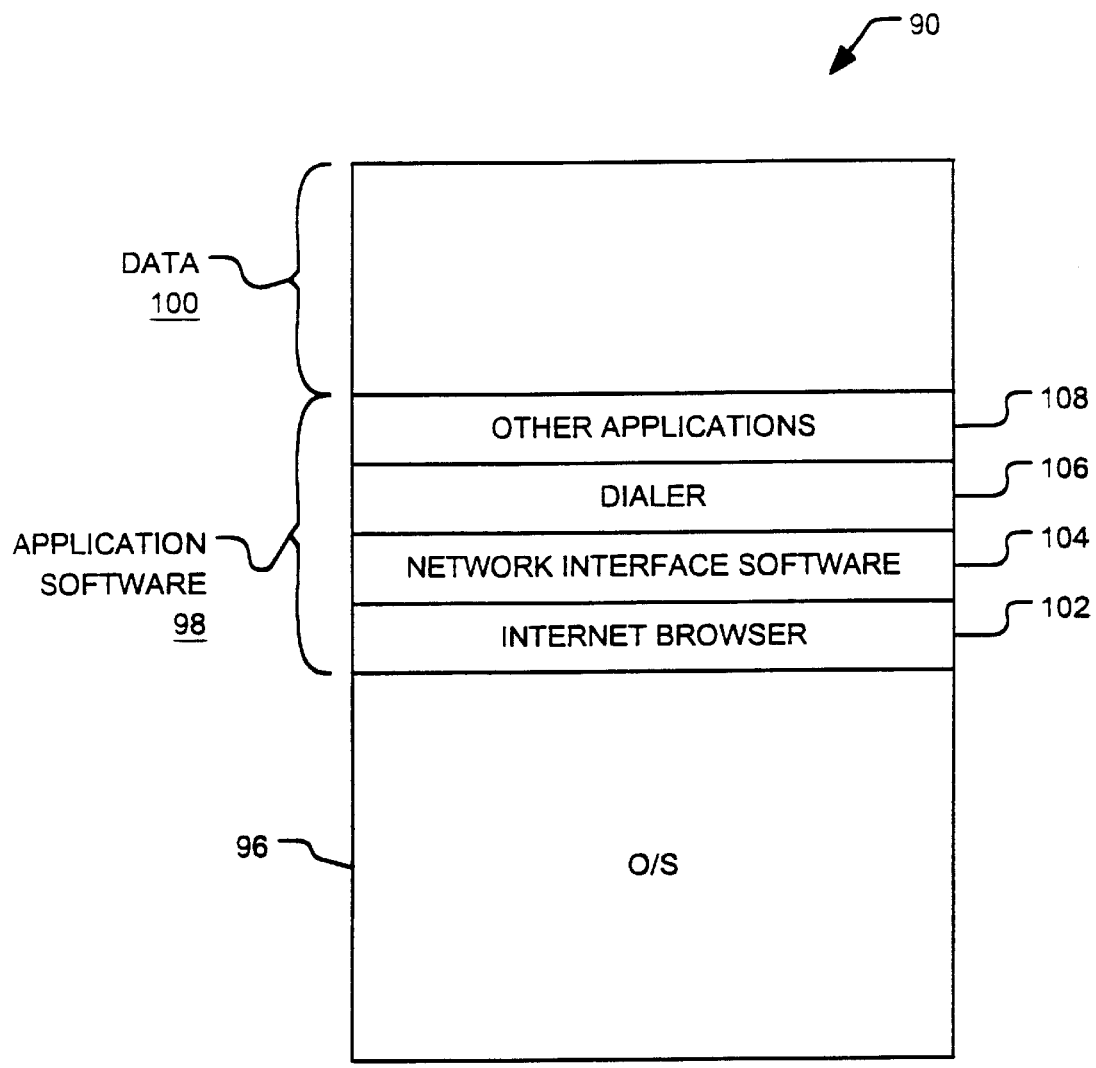
FIG. 6 illustrates an organization of memory of the device of FIG. 5.

An exemplary organization of persistent storage memory 90 of device 18 is illustrated in FIG. 6. As with memory 42 of server 16, stored within memory 90 are computer software programs and data that are loaded into operating memory of device 18. These permit device 18 to be operable as an end-user work station. As illustrated, memory 90 stores operating system software 96; application software 98; and data 100. Operating system software 96 may, for example, be Microsoft Windows NT Workstation operating system software; Windows 3.1, 95 or 98 software; Apple System 7.5 operating system software; or the like. Application software 98 includes network interface software 104, which also typically includes an internet protocol suite allowing communication of computing device 18 over modem 88 (FIG. 5) and thus operating system 96 with network 10 (FIG. 1). Application software 98 further comprises a modem dialer 106 that operates modem 88 to establish temporary connections to data network 10 by way of the PSTN, as detailed below. Application software 98 may further comprise an internet browser application 102, such as the known Netscape, Mosaic, or Microsoft Internet Explorer browser applications; and other applications 108 otherwise employed by the end-user and operator of device 18. Again, application software 98 may be formed using conventional programming techniques known to those skilled in the art.

An exemplary organization of server 14 is not explicitly illustrated. Server 14, is preferably also a conventional network capable computer server similar to server 16. Server 14, however, is adapted to act as a domain name server to provide DNS as detailed in RFC 2136, and 2137, and accordingly stores data and executes DNS software to provide this service. Briefly, as understood by those skilled in the art, server 14 acting to provide DNS resolves assigned domain names, identified as part of uniform resource locators ("URL"s). Network interconnected devices dispatch messages containing alphanumeric domain names to server 14 over network 10, and are returned numeric thirty-two bit IP addresses, based on database entries at server 14. For each domain name, server 14 stores one or more numeric stored IP addresses. For domain names with multiple stored IP addresses, addresses to alternate interconnected devices are returned sequentially in order to distribute requests between servers.

As illustrated in FIG. 1, example servers 16a, 16b and 16c are each identified by at least one URL "www.server1.com", "www.server2.com", and "www.server3.com". These URLs are used by device 18 and other devices to request service from servers 16a, 16b and 16c. Additionally, server 16a is identified by a second URL "www.message.com". As will become apparent, this URL is used by device 18 in order to obtain an identifier of one of the servers 16a, 16b, and 16c that will ultimately provide service to device 18.

With reference to FIG. 1, in operation, an end-user at device 18 "subscribes" with one of servers 16a, 16b and 16c in order to obtain service from one of servers 16a, 16b and 16c. An example subscription or registration process is detailed in U.S. patent application Ser. No. 09/144,111, entitled "NETWORK INTERCONNECTED COMPUTING DEVICE, SERVER AND NOTIFICATION METHOD" filed concurrently herewith and naming Carl Potvin as inventor, now issued as U.S. Pat. No. 6,393,467. As part of the subscription process, device 18 contacts one of servers 16a, 16b and 16c using that server's well known URL. For illustration purposes, a user "Jane Doe" may contact server 16a identified by its URL "www.message.com". Specifically, browser 102 at device 18 contacts server 16a, and provides service subscription information to device 16a which is stored at server 16a in record 72b by CGI programs 65 in co-operation with HTTP server application 60, and database engine 64. Subscription information may include the subscriber's name, telephone number, e-mail address, billing information, and service information that is stored in a record 72 of database 68. At the conclusion of the subscription process, server 16a may provide device 18 with a unique identifier that is stored at device 18 as a persistent state object or as a permanent "cookie", as detailed in RFC 2019, the contents of which are hereby incorporated by reference. Again, server 16a uses HTTP server application 60, CGI programs 65 and database engine 64 to generate and provide the persistent state object.

As will be appreciated, the contents of database 68 may be maintained at any or all of devices 16a, 16b or 16c. Data may be mirrored or distributed among servers 16a, 16b, and 16c using conventional techniques. Servers 16a, 16b and 16c could, for example, maintain identical databases by exchanging database entries using network 10.

As will further be appreciated, communications between device 18 and servers 16a, 16b and 16c may be effected through network interface software using the known transmission control protocol ("TCP/IP") as detailed in RFC 793, or the uniform datagram protocol ("UDP/IP") as detailed in RFC 768, or using any other suitable protocol over network 10.

Each of servers 16a, 16b and 16c is adapted to offer substantially similar services. However, servers 16a, 16b and 16c, in combination, are adapted to provide services to a large number of subscribers, such as a subscriber located at device 18. As will be apparent, it would be desirable to distribute the provision of services among servers 16a, 16b and 16c thereby allowing each of the servers 16a, 16b and 16c to process a fraction of the total number of subscribers. The distribution of subscribers to whom services are provided by servers 16a, 16b and 16c, among these servers, may be accomplished in a number of ways, including, by service type (or combination of services), geographically, by telephone dial number or otherwise. However, ideally the distribution of service among the servers 16a, 16b, and 16c should be transparent to each subscriber. Each subscriber should be able to access the service by a single URL, common to all subscribers. Once the criteria for allocating servers to subscribers has been selected, CGI programs 65 may select an appropriate server and update field 84 of a subscriber record during the subscription process. As should be appreciated, field 76 could be eliminated if some other mapping scheme is used. As will become apparent, in the preferred embodiment, the identifier provided to device 18 during the registration process is later used to retrieve the contents of field 84 for a subscriber and direct the device 18 to the allocated one of servers 16a, 16b and 16c.

Figure 7:
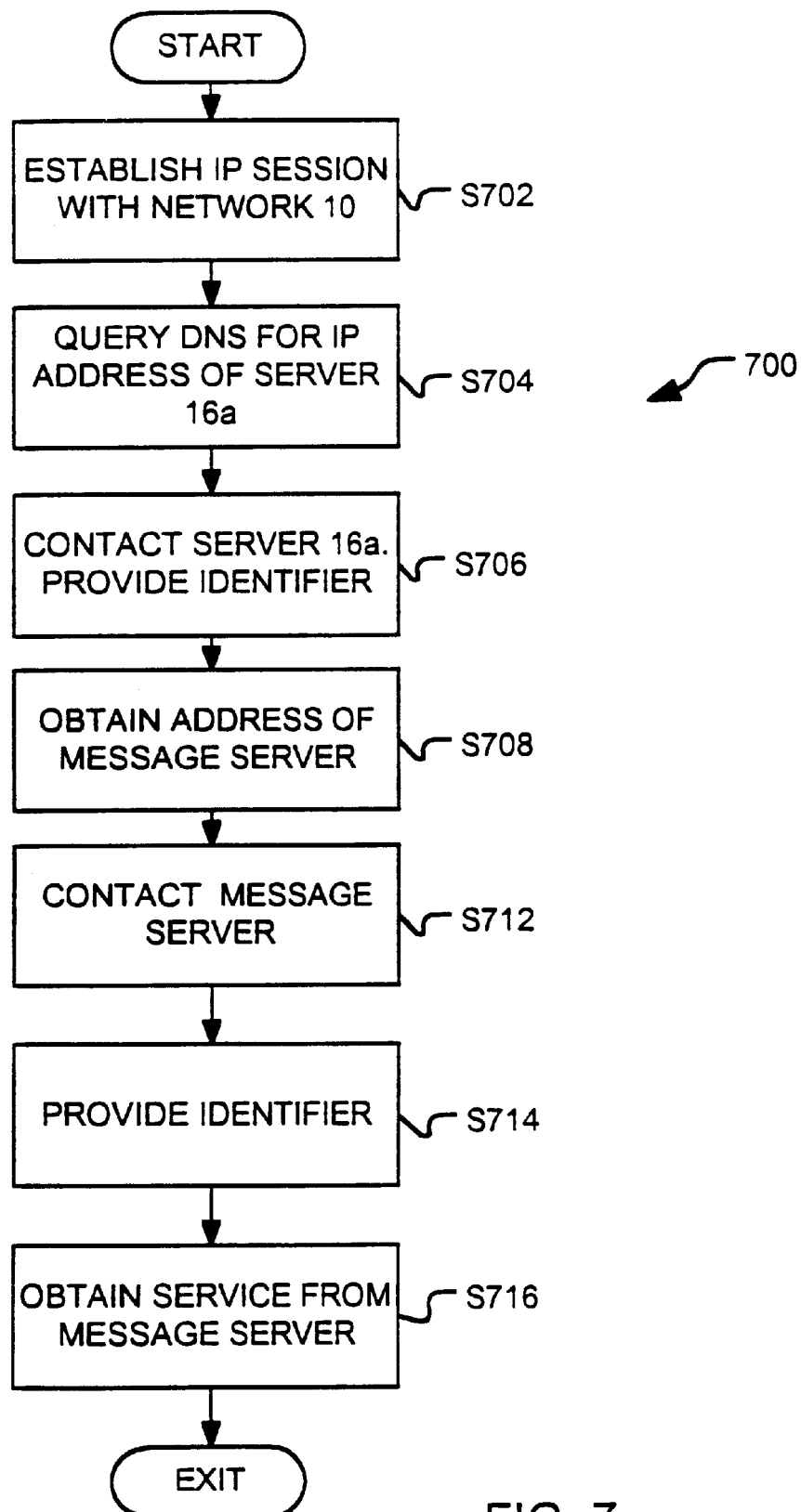
FIGS. 7 and 8 illustrate steps in methods exemplary of embodiments of the present invention.
Figure 8:
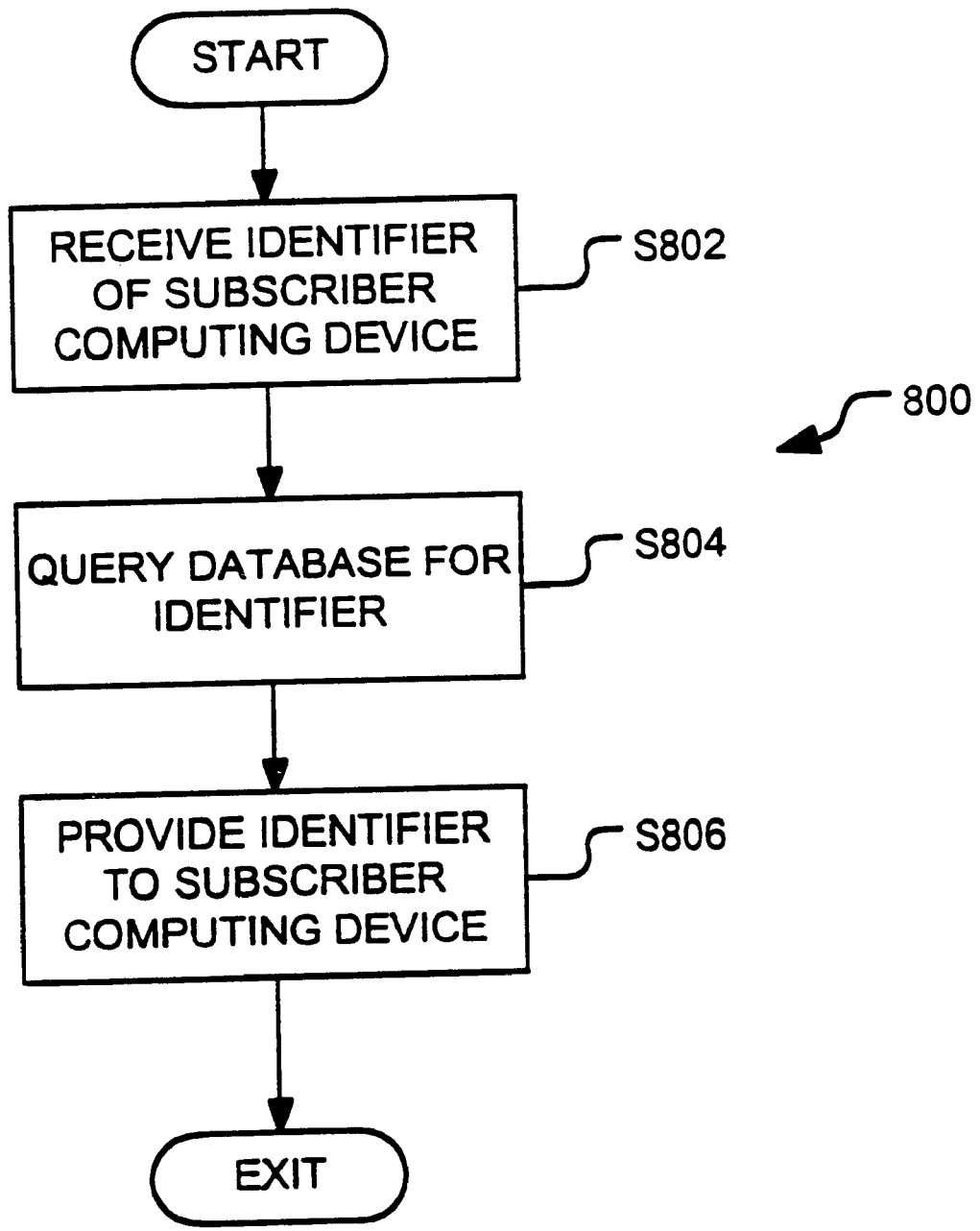

Specifically, steps 700 and 800 performed by device 18 at a later time in order to obtain service from one of servers 16a, 16b and 16c are illustrated in FIGS. 7 and 8, respectively. As illustrated, after subscription to the service, the subscriber at device 18 establishes an internet connection to network 10 through, for example, the PSTN in step S702. An internet connection is typically established through the PSTN by running or launching dialer application 106 (FIG. 6) at device 18; establishing a PSTN circuit between computing device 18 and an internet service provider ("ISP", not shown); and establishing a data link between modems at the ISP and device 18. This link may be established by a serial link internet protocol ("SLIP") or a point-to-point-protocol ("PPP") IP connection between device 18 and the ISP.

As part of establishing this IP link between computing device 18 and the ISP, the ISP may assign a temporary "session" IP address to device 18. This session IP address now uniquely identifies device 18 on network 10 and allows IP packets to be directed to computing device 18 during this session. Device 18 may now notify the identified server 16a, that device 18 is "on-line" by querying DNS 14 using a known URL of the service which corresponds to one of server 16a, using, for example, web browser application 102, in step S704. In the example embodiments, server 16a is identified by the URL "www.message.com". Next, device 18 contacts server 16a using the numeric IP address of server 16a and provides an indicator (typically a persistent state object or "cookie" stored at device 18) that device 18 is network interconnected ("on-line"), and optionally the session IP address of device 18 in step S706, as detailed in U.S. patent application Ser. No. 09/144,111, entitled "NETWORK INTERCONNECTED COMPUTING DEVICE, SERVER AND NOTIFICATION METHOD" filed concurrently herewith and naming Carl Potvin as inventor, now issued as U.S. Pat. No. 6,393,467.

In response, in step S802, server 16a receives the message containing the identifier dispatched in step S704 and uses server resolution application 62 (FIG. 3) to query its database 68 (FIG. 4) to locate a record containing a matching identifier in field 76 in step S804. Server resolution application 62 determines an appropriate server 16a, 16b and 16c that will provide the subscribed service to the subscriber at device 18 from field 84 of the appropriate record. The IP address or URL including a domain name of the appropriate one of servers 16a, 16b or 16c contained in field 84 is provided to device 18 in step S806 and received in step S708. In the example embodiments, for subscriber "Jane Doe", server 16a returns a URL of "www.server2.com", identifying server 16b. As well, IP address field 82 and status field 78 may be updated when the subscriber has registered with server 16. Additionally, browser 102 may be provided with a temporary persistent state object or "cookie", stored at device 18 and indicating that device 18 is on-line.

Device 18, upon receiving the message containing the URL identifying server 16b, contacts DNS server 14 to obtain the numeric IP address of server 16b corresponding to the URL "www.server2.com" in step S710 and thereafter contacts the identified server 16b in step S712 and provides server 16b with registration information similar to that provided to server 16a, immediately after establishing the IP session in step S702, in step S714. As will be appreciated by those skilled in the art, the URL identifying server 16b may be provided by way of a Java script, or an HTTP redirection tag. This makes contact of server 16b appear seamless to an end-user.

Server 16b is again provided, registration information that is typically provided transparently by device 18, by providing server 16b with a "cookie" containing the identifier of device 18. The identified server 16b may then provide data, and thus the subscribed service, to device 18 by way of the device's IP address. Device 18 thus receives a subscribed to service from server 16b, in steps S716.

Of course, if server resolution application 62 determines server 16a should provide the service, registration information need not again be provided by device 18. Instead, information provided in step S706 may be used to provide the subscribed service to device 18. As noted, in the preferred embodiment, server 16a is identified by two URLs: one URL, "www.message.com", is used to initially access the service and obtain an URL of an appropriate server, while another URL, "www.server1.com", is used to obtain service from server 16a. If server 16a provides the service as well as determines an appropriate server, the use of the second URL could be eliminated.

In the preferred embodiment, each of servers 16a, 16b and 16c provide an ICW service, as more particularly described in U.S. patent application Ser. No. 08/911,036. For this purpose, each of servers 16a, 16b, and 16c comprises messaging application 67 (FIG. 3) that adapts each server to provide a subscriber with an indication of an incoming PSTN telephone call by way of network 10. As will be appreciated, as the ICW service will typically be provided to a large number of subscribers, the above described method may be used to contact and obtain ICW service from any of servers 16a, 16b and 16c. Typically, each of servers 16a, 16b, and 16c will be specifically adapted to provide ICW service to subscribers connected to specified central office switches of the PSTN, as identified by the end-users telephone dial number. For each subscriber one of servers 16a, 16b and 16c is provided with an indication of an incoming call by way of the call forward busy feature of the subscriber's central office switch. Typically only a single server is in communication with a subscriber's central office switch and will therefore be adapted to provide the ICW service for that subscriber.

The ICW service, however, is typically identified by a single URL, such as the disclosed "www.message.com" URL, to all subscribers. In the example embodiment, this URL identifies a resource at server 16a that is used to direct device 18 to an appropriate server. Browser application 102 is used to contact server 16a at this URL (step S704). Server 16a, in turn identifies one of the servers 16a, 16b and 16c to provide the ICW service for a subscriber at device 18 (steps S802–S806). Device 18, in turn contacts the appropriate server 16a, 16b or 16c, registers its "on-line" presence (step S708–714), and obtains the ICW service from the appropriate server (step S716).

As will be appreciated only a single device 18 for a single subscriber has been illustrated. Typical servers 16a, 16b and 16c will provide service to large numbers of subscribers operating end-user computing devices interconnected with network 10. Similarly, many other servers like servers 16a, 16b and 16c may co-operate to provide service to all subscribers.

As well, while in the preferred embodiment, device 18 contacts one of servers 16a, 16b, 16c, a person skilled in the art will appreciate that server 16a could serve as a proxy for servers 16b and 16c and contact these servers on behalf of device 18. As will additionally be appreciated, server 16a need not directly provide subscriber services to end-user, but might only act to resolve other servers for subscribers.

While the above embodiment has been described in the context of a temporary connection to network 10 using the PSTN, a person skilled in the art will appreciate that the described embodiments could easily be modified to accommodate other temporary or permanent data network connections, by way of, for example a wireless network, an ISDN connection, an asynchronous digital subscriber line ("ADSL") connection, or another connection known to those skilled in the art. In such modified embodiments, it may be possible to eliminate the use of a stored identifier at device 18. For example, instead, of using a stored identifier, device 16a could use the IP address, or a portion of this address, of device 18 in order to decide which of servers 16a, 16b and 16c should provide the service. As well, each of servers 16a, 16b and 16c could be adapted to redirect queries for interconnected devices to other servers. As such entries at DNS server 14 for a particular service could resolve DNS queries to the delivered service to any of servers 16a, 16b or 16c. The server contacted as a result of the DNS resolution then redirects device 18 to the appropriate one of server 16a, 16b and 16c.

Additionally, while the above embodiments have been described specifically with reference to an ICW service, the embodiments could be easily adapted to provide network commerce based services, other messaging services, or simply to distribute server load between multiple servers.

Moreover, while the organization of software and data components at device 26 and gateway 16 has been illustrated as clearly delineated, a person skilled in the art will appreciate that the delineation between applications, network interface software and operating system software is somewhat arbitrary. Other arrangements of such software are possible. For example, network interface software 104 and 58 may form part of operating system software 52 or 96. Similarly, while the embodiments have been described using the specific IP, and UDP/IP protocols other suitable protocols, such as for example the IPX or SPX protocols, could be used.

It will be further understood that the invention is not limited to the embodiments described herein which are merely illustrative of a preferred embodiments of carrying out the invention, and which are susceptible to modification of form, arrangement of parts, steps, details and order of operation. The invention, rather, is intended to encompass all modifications within its spirit and scope, as defined by the claims.

What is claimed is:

1. A method of providing incoming call notification of telephone calls received over a telephone network, to a subscriber at computing device associated with said subscriber by way of a packet switched data network, said method comprising:

operating a plurality of incoming call notification servers, each interconnected with said telephone network and said packet switched data network, each of said incoming call notification servers operable to provide said incoming call notification to specific subscribers;

receiving from said computing device associated with said subscriber at a first network interconnected server, over said packet switched data network, a request to contact a server providing said incoming call notification;

receiving over said packet switched data network from said computing device associated with said subscriber at said first network server, an identifier of said computing device associated with said subscriber;

redirecting said request to a specific one of said plurality of call notification servers interconnected with said packet switched data network capable of providing said subscriber with said incoming call notification service, based on said identifier.

2. The method of claim 1, further comprising providing said specific one of said plurality of call notification servers with an assisted computer network address of said computing device associated with said subscriber, to later obtain said incoming call notification from said specific one of said plurality of call notification servers.

3. The method of claim 1, wherein said assigned computer network address comprises a temporarily assigned internet protocol (IP) address.

4. The method of claim 3, wherein said identifier is stored at said computing device associated with said subscriber.

5. The method of claim 4, wherein said identifier comprises a persistent state object.

6. The method of claim 5, wherein said first network interconnected server is identified on said packet switched data network by a uniform resource locator ("URL").

7. The method of claim 6, wherein said redirecting comprises providing a network address of said specific one of said plurality of servers to said computing device associated with said subscriber.

8. The method of claim 6, wherein said redirecting comprises providing said computing device associated with said subscriber with a URL of said specific one of said servers.

9. The method of claim 1, further comprising maintaining at said first network interconnected server a database mapping call notification servers to subscribers based to permit said redirecting based on said identifier.

10. A method of providing incoming call notification of telephone calls received over a telephone network, to a subscriber at a computing device associated with said subscriber by way of a packet switched data network, said method comprising:

receiving from said computing device associated with said subscriber at a first network interconnected server, over said packet switched data network, a request to contact a server providing said incoming call notification;

receiving over said packet switched data network from said computing device associated with said subscriber at said first network server, an identifier of said computing device associated with said subscriber;

based on said identifier, redirecting said request to a specific one of a plurality of call notification servers interconnected with said packet switched data network and said telephone network and capable of providing said subscriber with said incoming call notification.

11. The method of claim 10, wherein said identifier comprises a persistent state object.

12. Computer readable medium storing processor readable instruction that when loaded at a network server including a processor, adapt said server to perform the method of claim 10.

13. A server interconnected with a packet switched data network, said server comprising a processor and computer readable memory storing program instruction and data adapting said server to:

receive from a computing device associated with a subscriber at a first network interconnected server, over said packet switched data network, a request to contact a server providing incoming call notifications over said packet switched data network of telephone calls received over a telephone network, for said subscriber;

redirect said request to a specific one of a plurality of call notification servers interconnected with said packet switched data network and said telephone network, each of said incoming call notification servers for providing incoming call notification of telephone calls received over a telephone network to specific subscribers at an associated computing device by way of a packet switched data network, said specific one of said incoming call notification servers capable of providing said subscriber with said incoming call notification, based on said identifier.

* * * * *